United States Patent [19]
Sugano et al.

[11] Patent Number: 4,467,675
[45] Date of Patent: Aug. 28, 1984

[54] SHIFT DEVICE FOR HYDRAULIC CONTROL SYSTEM FOR AUTOMATIC TRANSMISSION

[75] Inventors: Kazuhiko Sugano; Kazuyoshi Iwanaga, both of Yokohama, Japan

[73] Assignee: Nissan Motor Company, Limited, Yokohama, Japan

[21] Appl. No.: 351,747

[22] Filed: Feb. 24, 1982

[30] Foreign Application Priority Data

Feb. 28, 1981 [JP] Japan ................................ 56-27664

[51] Int. Cl.³ ...................... B60K 41/08; B60K 41/12
[52] U.S. Cl. ..................................... 74/869; 74/867; 74/868
[58] Field of Search .............. 74/867, 868, 869, 687, 74/730, DIG. 1

[56] References Cited

U.S. PATENT DOCUMENTS

| | | | |
|---|---|---|---|
| 3,078,736 | 2/1963 | Meads et al. | 74/868 X |
| 3,613,484 | 12/1969 | Pierce et al. | 74/869 |
| 4,291,596 | 9/1981 | Sakakibara | 74/869 X |
| 4,325,271 | 4/1982 | Iwanaga et al. | 74/869 |
| 4,349,088 | 9/1982 | Ito et al. | 74/869 X |

FOREIGN PATENT DOCUMENTS 2033033 5/1980 United Kingdom ................ 74/868

Primary Examiner—Allan D. Herrmann
Assistant Examiner—Bruce F. Wojciechowski
Attorney, Agent, or Firm—Schwartz, Jeffery, Schwaab, Mack, Blumenthal & Koch

[57] ABSTRACT

A hydraulic control system comprises first and second shift valves which cooperate with each other to effect a shift between two gear ratios. The first shift valve has a port and two different pressure acting areas which are exposed to pressure from the port depending upon downshift and upshift states of the first shift valve, respectively. The second shift valve effects communication between signal pressure generating means and the port of the first shift valve when the second shift valve is in one of two states to deliver the signal pressure to the port of the first shift valve. A kickdown pressure generating means delivers a kickdown pressure to the first shift valve.

8 Claims, 9 Drawing Figures

4,467,675

SHIFT DEVICE FOR HYDRAULIC CONTROL SYSTEM FOR AUTOMATIC TRANSMISSION

BACKGROUND OF THE INVENTION

1. Field of the Invention

The present invention relates to a hydraulic control system for an automatic transmission and more particularly to a shift device for controlling a shift between gear ratios in an automatic transmission.

2. Description of the Prior Art

The automatic transmission is designed such that gear ratios are selectively established by switching the friction element or elements, such as a clutch or a brake, to be engaged, and the control of a shift is carried out by shift valves provided in a hydraulic control system. (For example, in the case of a forward three speed automatic transmission, the shift control is carried out by two shift valves, viz., a 1-2 shift valve and a 2-3 shift valve.) Commonly, a conventional shift valve is constructed such that a throttle pressure indicative of an opening degree of a throttle valve of an engine and a governor pressure indicator of a vehicle speed of a motor vehicle are exerted on a spool of the shift valve in opposed directions, allowing the spool to shift between two positions in response to the relationship in magnitude between them, thus supplying or discharging a line pressure to or from a corresponding friction element or elements. Therefore, a shift line, Viz., a throttle opening degree Vs., a vehicle speed characteristic, on which the shift valve switches from one state to onother state has been a straight line or a quadratic curve. With this shift line, it is difficult to provide a drive feel fit for the characteristic of an engine and that of a motor vehicle over the whole throttle opening degrees. For example, if shift points are set fit for operation within a relatively large throttle opening degree range, shift points become too high to be appropriate or too low to be appropriate for operation within a medium or small throttle opening degree range, thus failing to provide appropriate shift points. A conventional shift valve is provided with an oil pressure acting area on which an oil pressure (throttle pressure of line pressure or the like) acts when a spool is in a downshift position (for example, in the case of a 2-3 shift valve, the term "downshift position" is herein used to mean a position which a spool of the shift valve takes in a second gear ratio state and the term an "upshift position" is used to mean a position which the spool takes in a third gear ratio state) so as to provide a hysteresis between a shift point for an upshift and a shift point for a downshift, but, with this construction, it is difficult to provide a desired hysteresis at any given throttle opening degree over the whole throttle opening range and thus a shift point for an upshift may not be set in a desired manner or in an independent manner from the setting of a shift point for a downshift. The shift points under a kickdown condition when the accelerator pedal is fully depressed are usually set at a relatively high vehicle speed side as compared to the ordinary case by applying an additional pressure, such as a line pressure, to the shift valves, but, sicne the shift points under the kickdown condition are so closely related to the corresponding shift points under ordinary conditions that this makes it difficult to set the former group of shift points independently from the latter group or shift points, thus causing a difficulty in designing the shift points in a desired manner. In summary, since, in the case of the conventional shift valve, throttle pressure and governor pressure are compared with each other by a single shift valve to determine a shift point, it is a problem that since the shift points can not be chosen freely, shift points for upshift and downshift under ordinary condition (non-kickdown condition) or under kickdown condition can not be set in a desired manner over the whole throttle opening range.

SUMMARY OF THE INVENTION

According to the present invention, a hydraulic control system for an automatic transmission comprises a first shift valve, a second shift valve and kickdown pressure generating means for delivering kickdown pressure to the first shift valve. The first shift valve has a port and two different pressure acting areas which are alternatively exposed to pressure from the port depending upon downshift and upshift states of the first shift valve, respectively. The second shift valve effects communication between signal pressure generating means and the port of the first shift valve when the second shift valve is in one of two states thereof to deliver the signal pressure to the port of the first shift valve. The first shift valve has a kickdown pressure port and two different pressure acting areas which are alternatively exposed to kickdown pressure from the kickdown port depending upon downshift and upshift states of the first shift valve.

Accordingly, an object of the present invention is to provide a hydraulic control system wherein it is easy and relatively unrestricted to design a shift point for an upshift and a shift point for a downshift over the whole range of operating conditions.

BRIEF DESCRIPTION OF THE DRAWINGS

The invention will be further described hereinafter in connection with the accompanying drawings, wherein.

DESCRIPTION OF THE EMBODIMENT

Figure 1:
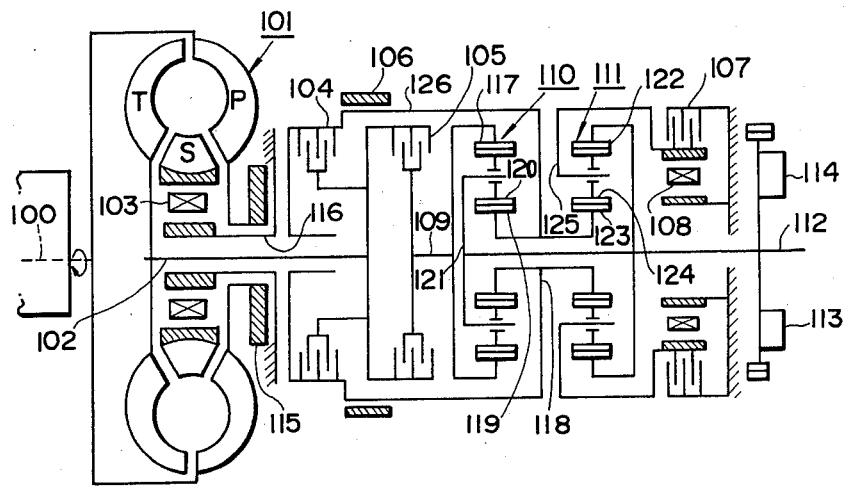
FIG. 1 is a schematic view of a change-speed gearbox used in an automatic transmission.

Referring to FIG. 1, a change-speed gearbox of an automatic transmission is illustrated which is controlled by a hydraulic control system according to the present invention. The change-speed gearbox provides three forward gear ratios and one reverse gear ratio and comprises a crank shaft 100 to be driven by an engine, a torque converter 101, an input shaft 102, a front clutch 104 (a high and reverse clutch), a rear clutch 105 (a forward clutch), a second brake 106 (an intermediate brake), a low-and-reverse brake 107, a one-way clutch 108, an intermediate shaft 109, a first planetary gear set 110, a second planetary gear set 111, an output shaft 112, a first governor valve 113, a second governor valve 114 and an oil pump 115.

The torque converter 101 comprises a pump impeller P, a turbine runner T and a stator S, of which the pump impeller P is driven by the crank shaft 100 so that the torque converter working oil contained therein is caused to swirl and imparts torque to the turbine runner T which is secured to the input shaft 102. The torque is further delivered through the input shaft 102 to the change-speed gearbox. The stator S is mounted about a sleeve 116 with an one-way clutch 103 interposed therebetween. The one-way clutch 103 is constructed and arranged in such a manner so as to permit a rotation of the stator S in the same direction as the direction of rotation of the crank shaft 100, viz., the direction indicated by the arrow (abbreviated hereinafter as forward rotation) and to prevent the opposite rotation of the stator (abbreviated hereinafter as opposite rotation).

The first planetary gear set 110 comprises an internally toothed gear 117 rotatable with the intermediate shaft 109, a sun gear 119 rotatable with a hollow transmission shaft 118, two or more planet pinions 120, each meshing with the internally toothed gear 117 and the sun gear 119 so that it rotates and moves along an orbit, and a front planet carrier 121 rotatable with the output shaft 112 and having the planet pinions 120 thereon; while the second planetary gear assembly 111 comprises an internally toothed gear 122 rotatable with the output shaft 112, a sun gear 123 rotatable with the hollow transmission shaft 118, two or more planet pinions 124, each meshing with the internally toothed gear 122 and the sun gear 123 so that it rotates and moves along an orbit, and a rear planet carrier 125 having the planet pinions 124.

Referring to the friction units, the front clutch 104 is operative to establish a connection between the transmission input shaft 102 to be driven by the turbine runner T and the hollow transmission shaft 118, rotatable in unison with the two sun gears 119 and 123 through a drum 126, while the rear clutch 105 is operative to connect the input shaft 102 and the internally toothed gear 117 of the first planetary gear assembly 110 through the intermediate shaft 109. The second brake 106 is operative to tighten a band winding the drum 126 secured to the hollow transmission shaft 118 so as to lock the two sun gears 119 and 123, while the low-and-reverse brake 107 is operative to lock the rear planet carrier 125 of the second planetary gear assembly 111. On the other hand, the one-way clutch 108 is so constructed and arranged as to permit the forward rotation of the rear planet carrier 125 but prevent the opposite rotation of the same. The first governor valve 113 and second governor valve 114 are fixed to the output shaft 112 and are operative to produce a governor pressure indicative of the vehicle speed.

Description will be hereinafter made of the power flow paths which are established during operation in an automatic forward drive range (D range).

Under this condition, the rear clutch 105 serving as the forward input clutch is engaged. The power from the engine and having passed through the torque converter 101 is transmitted, through the input shaft 102 and rear clutch 105, to the internally toothed gear 117 of the first planetary gear set 110. The rotation of the internally toothed gear 117 causes the planet pinions 120 for rotation in the forward direction. Since the sun gear 119 tends to rotate in the opposite direction to urge the sun gear 123 of the second planetary gear set 111 rotatable with the sun gear 119 to rotate in the opposite direction, the planet pinions 124 of the second planetary gear set 111 tend to rotate in the forward direction. The one-way clutch 108 is operative to prevent the rear planet carrier 125 from tending to rotate in the opposite direction, so that the sun gear 123 serves as a reaction brake in the forward direction. As a consequence, the internally toothed gear 122 of the second planetary gear set 111 rotates in the forward direction. It therefore follows that the output shaft 112 rotatable with the internally toothed gear 122 also rotates in the forward direction, thereby producing the first forward gear ratio. When, under this condition, the second brake 106 is applied after the vehicle speed has increased, the power which has passed through the input shaft 102 and the rear clutch 105 as in the first gear condition is transmitted to the internally toothed gear 117. The second brake 106 is operative to lock the drum 126 to prevent rotation of the sun gear 119, thus serving as a reaction brake in the forward direction. Accordingly, the planet pinions 120 rotate and move along an orbit around the sun gear 119 which is held stationary with the result that the front planet carrier 121 and the transmission output shaft 112 integral with the former rotate in the forward direction at a speed although with a reduction ratio higher than the speed which would be achieved under the first gear ratio condition, thereby producing the second forward gear ratio. When the second brake 106 is released and the front clutch 104 is engaged after the vehicle speed has increased further, the power delivered to the input shaft 102 splits into a portion transmitted through the rear clutch 105 to the internally toothed gear 117 and into the remaining portion transmitted through the front clutch 104 to the sun gear 119. Therefore, the internally toothed gear 117 and the sun gear 119 are interlocked to rotate together with the front planet carrier 121 and the output shaft 112 at a common revolution speed in the forward direction, thereby producing the third forward gear ratio. Under this condition, the front clutch 104 and the rear clutch 105 may be referred to as an input clutch and there is no reaction brake so that the planetary gear sets do not lend themselves to multiplication of torque.

The power flow path to be established for a reverse drive range (R range) will be hereinafter described.

When this range is selected, both of the front clutch 104 and low-and-reverse brake 107 are made operative. The power from the engine having passed through the torque converter 101 is transmitted from the input shaft 102 through the front clutch 104 and the drum 126 to the sun gears 119 and 123. Since, under this condition, the rear planet carrier 125 is locked by the low-and-reverse brake 107, the rotation of the sun gears 119 and 123 in the forward direction causes the internally toothed gear 122 to rotate at a reduced speed in the reverse direction with the result that the output shaft 112 rotatable with the internally toothed gear 122 rotates in the reverse direction, thereby producing the reverse drive gear ratio.

Figure 2:
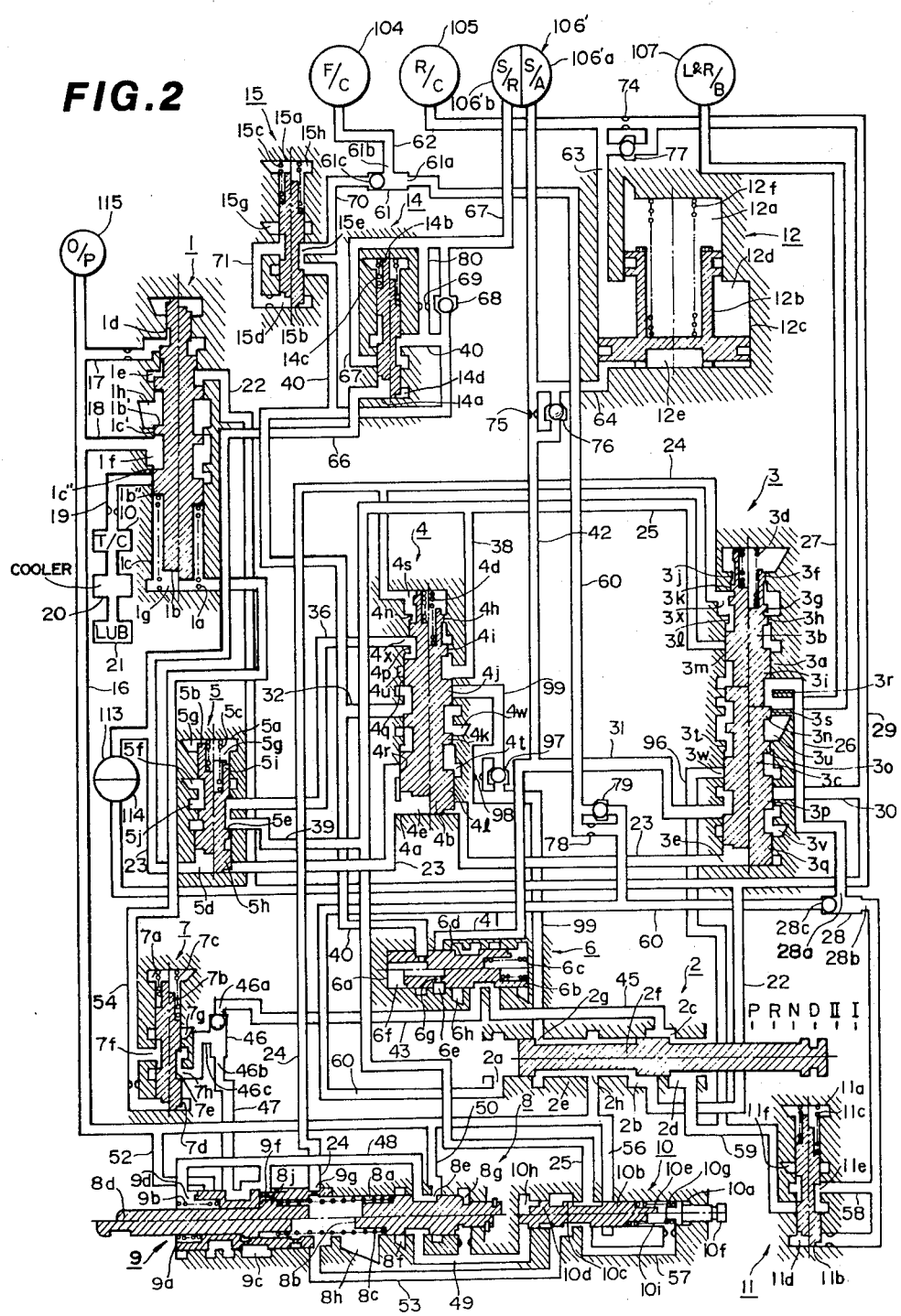
FIG. 2 is a circuit diagram showing a hydraulic control system for the automatic transmission according to the present invention.

The change-speed gearbox is controlled by the hydraulic control system shown in FIG. 2.

Referring to FIG. 2, the hydraulic control system comprises a regular valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle failsafe valve 9, a throttle modulator valve 10, a first gear range pressure reducing valve 11, an accumulator 12, a 3-2 timing valve 14 and a front clutch pressure reducing valve 15, all these valves being connected as shown in the illustrated circuit network to the torque converter 101, the front clutch 104, the rear clutch 105, a band servo 106' for operating the above described second brake 106 (see FIG. 1), the low-and-reverse brake 107, the governor valves 113 and 114 and the oil pump 115. The shift device according to the present invention comprises as a first shift valve a 2-3 shift valve 4 and as a second shift valve a 3-2 downshift valve.

The oil pump 15 is driven by the engine through the crank shaft 100 and the pump impeller P of the torque converter 101 and is operative to suck in an oil from an oil reservoir, not shown, the oil cleared of harmful dust by means of an oil strainer (not shown) and to feed the oil to a line pressure circuit 16 when the engine is in operation. The regulator valve 1 which is adapted to regulate the pressure of the oil to a predetermined level comprises a valve spool 1b, which is urged by means of a spring 1a for movement toward a raised position indicated by the left half of the spool in the drawing, slidably mounted within a housing 1c and also comprises four chambers 1d, 1e, 1f and 1g. To each of the chambers 1d and 1f is fed an oil pressure from the line pressure circuit 16 by way of oil conduits 17 and 18. To the chamber 1e is fed a line pressure from the port 2b of the manual valve 2 through an oil conduit 22 when the manual valve 2 is in any one of the D range, II range and I range positions which will be described later. The valve spool 1b has a land 1b' having a diameter slightly smaller than the diameter of the corresonding rib 1c' of the housing 1c so as to form therebetween a small clearance which serves as a variable area orifice. The oil in the chamber 1f is constantly discharged through this clearance and a drain port 1h at a rate which is determined by an amount of overlap between the land 1b' and the rib 1c' so that a high line pressure proportional to the amount of overlap is developed in the line pressure circuit 16. The valve spool 1b further has a land 1b'' which is slightly smaller in diameter than the bore 1c'' in the housing 1c so as to form a small clearance therebetween so that the oil in the chamber 1f is supplied through this clearance and an oil conduit 19 to the torque converter 101, the oil cooler 20 and the various lubricating parts 21 in the transmission mechanism.

The line pressure developed in the line pressure circuit 16 is directed to the manual valve 2, which serves as a fluid-flow direction change-over valve adapted to provide communication from the line pressure circuit 16 selectively to any one of the ports 2a, 2b, 2c, 2d and 2e when the selector lever (not shown) is manipulated for range selection, the valve comprising a valve spool 2f which is slidably mounted within a housing 2e. The valve spool 2f is movable between the neutral (N) range, an automatic forward drive (D) range, a manual second (II) range, a manual first (I) range, a reverse drive (R) range and a parking (P) range and is constructed such that the line pressure circuit 16 communicates with the ports indicated by the sign "o" in the following table when the above mentioned selector lever is operated to urge the valve spool 2f to move to these range positions. The ports which are not in communication with the line pressure circuit 16 are all made open to the drain openings 2h' and 2h'' on both ends of the housing 2e and thus serve as drain ports.

| Ports Range | 2a | 2b | 2c | 2d | 2g |
|---|---|---|---|---|---|
| P |   |   |   |   | o |
| R | o |   |   |   | o |
| N |   |   |   |   | o |
| D |   | o |   |   | o |
| II |   | o | o |   |   |
| I |   | o | o | o |   |

The first governor valve 113 and the second governor valve 114 are operative to develop a governor pressure having a magnitude corresponding to vehicle speed under forward drive ranges of a vehicle. When the manual valve 2 is in any one of the ranges D, II and I, the line pressure is first fed to the second governor valve 114 from the port 2b communicating with the line pressure circuit 16 by way of the conduit 22 as will be understood from the above table and, when the vehicle is moving, the second governor valve 114 regulates the line pressure into a governor pressure indicative of the vehicle speed and feeds this governor pressure to the first governor valve 113, where, when the vehicle speed increases beyond a predetermined value, the first governor valve 113 starts to allow the governor pressure into a governor pressure circuit 23. The governor pressure is thereafter distributed via the circuit 23 to the 1-2 shift valve 3, 2-3 shift valve 4 and 3-2 downshift valve 5 and controls the operations of these valves in the manners to be described later.

The 1-2 shift valve 3 comprises a housing 3a and two valve spools 3b and 3c which are arranged axially in line with each other and which are slidably mounted within the housing 3a. That end face of the valve spool 3b which is remoter from the valve spool 3c is acted upon by a spring 3d and that end face of the valve spool 3c which is remoter from the valve spool 3b is located in a chamber 3e. The valve spool 3b is formed with lands 3f, 3g, 3h and 3i which are larger in diameter in this sequence, while the housing 3a is formed with bores 3i, 3j, 3k and 3l which correspond to these lands, respectively. The spool 3c is formed with lands 3n, 3o and further with lands 3p, 3q which are larger in diameter than the former two lands, while, the housing 3a is formed with two bores 3r, 3s for the land 3n and a bore 3t for the land 3o. The 1-2 shift valve 3 is in communication with the governor pressure circuit 23, a kickdown pressure circuit 24 and a throttle modulator pressure circuit 25 as shown in the drawing and further with an oil conduit 27 which is to communicate with an oil conduit 26 or a drain port 3s depending upon the axial position of the land 3l. The governor pressure circuit 23 communicates with the chamber 3e, while, the kickdown pressure circuit 24 acts upon a differential area between the lands 3f, 3h when the spool 3b is in the position indicated by the right half thereof and acts upon the differential area between the lands 3g, 3i when the spool 3b is in the position indicated by the left half thereof. The throttle modulator pressure circuit 25 acts upon a differential area between the lands 3h, 3i when the spool 3b is in the position indicated by the right half thereof and is prevented from acting on the same when the spool 3b is in the position indicated by the left half thereof. The oil conduit 26 is in communication with an output port 28a of a shuttle valve 28, and the oil conduit 27 is in communication with the low-and-reverse brake 107. The 1-2 shift valve 3 is further in communication with an oil conduit 30 extending from an oil conduit 29 which leads to the rear clutch 105 after branching from the oil conduit 22 that leads from the port 2b to the governor valves 113, 114, and between the 1-2 shift valve 3 and 2-3 shift valve 4 is arranged an oil conduit 31 as connected to the 1-2 shift valve such that it is allowed to communicate with the oil conduit 30 or is prevented from communicating with same depending upon axial position of the land 3p. The oil conduit 31 communicates with a drain port 3t when the valve spool 3c is in the position indicated by the right half thereof. In the oil conduit 29 is provided an orifice 74 and a check valve 77 which are arranged in parallel with each other. A port 3w of a 1-2 shift valve 3 communicates via an oil conduit 96 with an oil conduit 59 that communicates with the port 2d of the manual valve 2 such that the oil pressure (line pressure from the port 2d of the manual valve 2) acts upon a differential area between the lands 3p, 3c when the spool 3c is in the position indicated by the right half thereof.

The 2-3 shift valve 4 comprises a housing 4a with a wall portion defining a valve bore and a valve element in the form of a valve spool 4b. The spool 4b is movable within the valve bore of the housing 4a between a downshift position, indicated by the right half in the drawing, and an upshift position, indicated by the left half in the drawing. The upper end face of the spool 4b is acted upon by a spring 4d within a chamber 4s, while, the lower end face thereof is exposed to a chamber 4e. The spool 4b is formed with different diameter lands 4h, 4i and 4j which are larger in diameter in this sequence, and a land 4k of the same diameter as that of the land 4j, and a land 4l larger in diameter than this land, while, the housing 4a is formed with different diameter bore sections 4n, 4p, 4q and 4r for these lands. The lands 4h, 4i, 4j, 4k and 4l are axially spaced from each other. The spool 4b has a circumferential groove between each two adjacent lands of the lands 4h, 4i, 4j, 4k and 4l. An oil conduit 32 is connected to a line pressure outlet port of the 2-3 shift valve 4 such that it is allowed to communicate with an oil conduit 99 via a line pressure inlet port of the 2-3 shift valve 4 and is prevented from communicating with a drain port 4w or is prevented from communicating with the oil conduit 99 and is allowed to communicate with the drain port 4w depending upon the axial position of the lands 4j and 4k. The land 4j closes the line pressure inlet port when the spool 4b is in the downshift position to, in turn, block communication between the oil conduits 99 and 32. When the spool 4b is in the upshift position, the land 4j opens the line pressure inlet port to, in turn, effect communication between the oil conduits 99 and 32. When the spool 4b is the upshift position, the land 4k is disposed at a position between the line pressure outlet port to which the oil conduit 32 connects and the drain port 4w. The oil conduit 99 communicates with the port 2g of the manual valve 2 and is provided with an orifice 98 and a check valve 97 which are arranged in parallel. The chamber 4e communicates with the governor pressure circuit 23 to receive governor pressure, while, the chamber 4s receiving the spring 4d communicates with the kickdown pressure circuit 24. The kickdown pressure acts upon the upper end face area (S1) of the land 4h when the spool 4b is in the downshift position. When the spool 4b is the upshift position, the kickdown pressure acts upon not only the upper end face are (S1) but also the differential area (S2) between the lands 4i, 4j. The governor pressure circuit 23 leads also to the port 4t so that the governor pressure acts upon a differential area (S4) between the lands 4k, 4l when the spool 4b is in the downshift position indicated by the right half thereof. A conduit 36 which is connected to a 3-2 downshift valve 5 communicates with the port 4x such that a throttle modulator pressure acts upon differential area (S2) between the lands 4h, 4i when the spool 4b is in the downshift position indicated by the right half in the drawing or upon a differential area (S3) between the lands 4i, 4j when the spool 4b is in the upshift position indicated by the left half in the drawing. A throttle modulator pressure circuit 25 communicates, via an oil conduit 38, with the port 4u of the 2-3 shift valve 4 such that it acts upon a differential area (S3) between the lands 4i, 4j when the spool 4b is in the downshift position indicated by the right half in the drawing. The port 4u is closed by the land 4j when the spool 4b is in the upshift position. The differential area (S4) is exposed to the port 4t when the spool 4b is in the downshift position, but the port 4b is closed by the land 4l when the spool 4b is in the upshift position.

The 3-2 downshift valve 5 comprises a housing 5a with a wall portion defining a different diameter bore and a valve element in the form of a valve spool 5b. The valve spool 5b is movable within the valve bore of the housing between a down-side position indicated by the right half in the drawing and an up-side position indicated by the left half in the drawing. Acted on one end face of the spool 5b is a spring 5c, while, the other end face is exposed to a chamber 5d. The oil conduit 36 connected to a signal pressure outlet port 5j of the 3-2 downshift valve 5 such that depending upon the axial position of the land 5e of the spool 5b, it communicates with a signal pressure inlet port to which an oil conduit 39 is connected or a drain port 5f. The chamber 5d communicates with the governor pressure circuit 23. The chamber 5g receiving the spring 5c is always drained. The lands 5h, 5e and 5i are smaller in diameter in this sequence. The lands 5h, 5e and 5i are axially spaced from each other and the spool 5b has a circumferential groove between each two adjacent lands.

The line pressure booster valve 6 comprises a housing 6a having a valve spool 6b slidably mounted therein, the valve spool 6b being urged to move leftwardly in the drawing by means of a spring 6c. The valve spool 6b is formed with grooves 6d and 6e and an oil passage 6g for providing communication between the groove 6e and a chamber 6f. The line pressure booster valve 6 is in communication with an oil conduit 40 to be open to the groove 6e when the valve spool 6b has moved to the left and an oil conduit 41 to be open to the groove 6e when the valve spool 6b has moved to the right. The oil conduit 40 which is joined by the oil conduit 32 extends to an orifice 69, a check valve 68, a 3-2 timing valve 14 and a front clutch valve 15, while, the oil conduit 41 connects with the oil conduit 31 and merging into an oil conduit 42 leading for connection to a servo apply chamber 106'a of the band servo 106'. The line pressure booster valve 6 is further in communication with an oil conduit 43 which is always open to the groove 6d and with an oil conduit 45 which is to be selectively brought into communication with the oil conduit 43 through the groove 6d depending upon the axial position of the valve spool 6b. The oil conduit 43 is in communication with one input port 46a of a shuttle valve 46 and the oil conduit 45 is in communication with the port 2c of the manual valve 2.

The transmission throttle valve 8 comprises a housing 8a having a valve spool 8b slidably mounted therein and a plunger 8d provided in line with the valve spool 8b via a spring 8c. The plunger 8d is connected to the accelerator pedal by means of, for example, a mechanical linkage and is adapted to be moved rightwardly in the drawing from an idling position indicated by the upper half of the plunger and thereby adding to the force of the spring 8c when the accelerator pedal is depressed. The valve spool 8b is formed with a groove 8e and a throttle pressure circuit 48 and an oil conduit 49 are provided in communication with the throttle valve 8 in such a manner as to be always open to the groove 8e. The throttle valve 8 is further provided with a drain port 8f which communicates with the throttle pressure circuit 48 through the groove 8e depending upon the axial position of the valve spool 8b, and with an oil conduit 50 extending from the line pressure circuit 16, while, the oil conduit 49 is in communication with a chamber 8g. Increasing the force of the spring 8 by moving the plunger 8d rightwardly as the accelerator pedal is depressed causes a throttle pressure to be provided to the throttle pressure circuit 48, the throttle pressure being created within the chamber 8g by draining the line pressure to the drain port 8f so as to balance with the spring force. Thus, the throttle valve 8 delivers a throttle pressure which corresponds to the force of the spring 8c (viz., the distance of stroke of the accelerator pedal depressed or throttle opening degree) and which is proportional to the throttle opening degree in a pattern as shown by a-e-b shown in FIG. 3. When the accelerator pedal is depressed to a kickdown position, the plunger 8d compresses the spring 8c to a full extent until it is brought into abutting engagement with the valve spool 8b and forces the valve spool 8b to move to a limit position closing the drain port 8f and thereby providing communication between the throttle pressure circuit 48 and the oil conduit 50. Under these conditions, the throttle pressure increases to a magnitude equal to that of the line pressure.

The throttle failsafe valve 9 comprises a sleeve 9a which is slidably mounted within the same housing 8a in such a manner as to guide the plunger 8d, the leftward movement of the sleeve being elastically limited by means of a spring 9b. The oil conduit 47 providing communication between the other inlet port 46b of the shuttle valve 46 and the throttle failsafe valve 9 communicates normally with a port 9c of the throttle failsafe valve 9. The throttle pressure circuit 48 communicates with a chamber 9d having accommodated therein the spring 9b on one hand, and on the other hand communicates via the port 9c with a chamber 9f to which an enlarged portion 8j of the plunger 8d is exposed, while, the kickdown pressure circuit 24 communicates with a port 9g. To the throttle failsafe valve 9 an oil conduit 52 leads from the line pressure circuit 16, which oil conduit is normally closed, but under an abnormal condition when the sleeve 9a takes the lower half position in the drawing, the oil conduit 52 is allowed to communicate with the oil conduit 47. During the movement of the plunger 8d in such a direction as being depressed, the throttle pressure developed in the throttle pressure circuit 48 is directed via the port 9e to the chamber 9f and acts on the enlarged portion 8j of the plunger 8d and imparts to the plunger 8d a force effective to move the plunger 8d inwardly against the force of the spring 8c, thus preventing the accelerator pedal from being excessively loaded by the spring 8c as the pedal is depressed. When, furthermore, the plunger 8d is moved into a kickdown position, the kickdown pressure circuit 24 which has been in communication with the drain port 8h through the port 9g is isolated from the drain port 8h and is permitted to communicate with the oil conduit 48 through the port 9e, chamber 9f and port 9g. Under this condition, the valve spool 8b is moved rightwardly in the drawing as previously described and, as a consequence, the line pressure in the oil conduit 50 is passed into the throttle pressure circuit 48 without being drained off, thereby developing in the circuit 24 a kickdown pressure which is equal in magnitude to the line pressure. The kickdown pressure thus delivered is supplied also to the throttle modulator valve 10 by way of an oil conduit 53. If a damage should take place in the mechanical linkage interconnecting the accelerator pedal and the plunger 8d and the plunger 8d should disengage from the accelerator pedal, the plunger 8d would be urged by a return spring, not shown, to move to the idling position which is indicated by the upper half of the plunger, and this movement of the plunger 8d forces the sleeve 9a to move leftwardly into the position indicated by the lower half thereof. In this state, since no force is imparted to the valve spool 8b by the spring 8c, the valve spool 8b assumes a position allowing the drain port 8f to be slightly opened and substantially fully closing the oil conduit 50. The oil conduit 47 is allowed to communicate with the oil conduit 52 in this state, thus delivering the line pressure to the oil conduit 47. The line pressure in the oil conduit 47 reaches through the shuttle valve 46 a pressure modifier valve 7 where it is modulated to a magnitude balancing with that spring force of a spring 7c when a valve spool 7b is in the lefthand position as indicated in the drawing and the thus modulated pressure is supplied through an oil conduit 54 to the chamber 1g of the pressure regulator valve 1, boosting the line pressure to its maximum value. As a consequence, the friction elements are actuated by the line pressure with the maximum value so as to enable the vehicle to reach a repair shop without any assistance thereto and without causing a burnt damage due to a slip in the friction elements.

The pressure modifier valve 7 comprises a housing 7a having a valve spool 7b slidably mounted within the housing and having one end face acted upon by a spring 7c and the other end face exposed to a chamber 7d. The valve spool 7b is formed with a groove 7e, while the housing 7a is formed with an output port 7f constantly open to this groove, a drain port 7g and an input port 7h. The ports 7g and 7h are arranged in such a manner that one of the ports is on the point of being opened when the other of the ports is on the point of being closed during movement of the valve spool 7b, the port 7f communicating with the chamber 7d through the oil conduit 54 on one hand and with the chamber 1g of the regulator valve 1, the port 7h communicating with the outlet port 7h of the shuttle valve 46.

With the pressure modifier valve 7 thus constructed, the spring 7c holds the valve spool 7b in any position which is lower than the position indicated by the left half in the drawing when the oil pressure developed in the port 7h is smaller than a set force of the spring 7c (the set force of the spring 7c being a spring force as achieved when the valve spool 7b is held in the position indicated by the left half thereof), thereby closing the drain port 7g and providing communication between the port 7f and the port 7h so that the oil pressure developed in the port 7h is directed to the port 7f and further through the oil conduit 54 to the regulator valve 1. Throughout these conditions, the oil pressure is directed also to the chamber 7d and causes the valve spool 7b to move from the position indicated by the right half thereof to the position indicated by the left half thereof against the force of the spring 7c as the oil pressure increases. If, however, the oil pressure to be delivered from the port 7f tends to further increase, the valve spool 7b is moved upwardly beyond the position indicated by the left half of the spool and permits the port 7f to communicate with the drain port 7g with the result that the oil pressure to be delivered into the oil conduit 54 is prevented from increasing beyond a certain value which is dictated by the force of the spring 7c as provided under a condition in which the valve spool 7b is held in the position indicated by the left half thereof, so that when the throttle pressure in the circuit 48 is supplied via the shuttle valve 46 to the port 7h, the pressure modifier valve 7 produces an oil pressure called a pressure modifier pressure which varies such that the oil pressure stops increasing after the throttle opening degree has increased further beyond, for example, two fourths (2/4) of the full opening degree as shown by a-e-f in FIG. 3.

The throttle modulator valve 10 comprises a housing 10a having slidably mounted therein a valve spool 10e which is formed with three lands 10b, 10c and 10d (lands 10b, 10c having the same diameter, while, the land 10d with a diameter smaller than the former two) and which has one end face thereof being acted upon by a spring 10g which spring force is adjustable by means of an adjuster 10f and the other end face thereof exposed to a chamber 10h. A circuit 25 is connected to the housing 10a in such a manner as to be at all times open to the groove between the lands 10b and 10c, while, an oil conduit 53 and an oil conduit 56 (viz., an oil conduit branching from the line pressure circuit 16) are connected to the housing 10a in such a manner that one of these oil conduits initiated to open when the other thereof completely closes during movement of the valve spool 10e. The housing 10a is further connected with an oil conduit 57 aligned with the connecting port of the circuit 25, the oil conduit 57 being in communication with a chamber 10i having a spring 10g accommodated therein. Furthermore, a chamber 10h is provided which is in communication with the throttle value 8 through an oil conduit 49.

Figure 3:
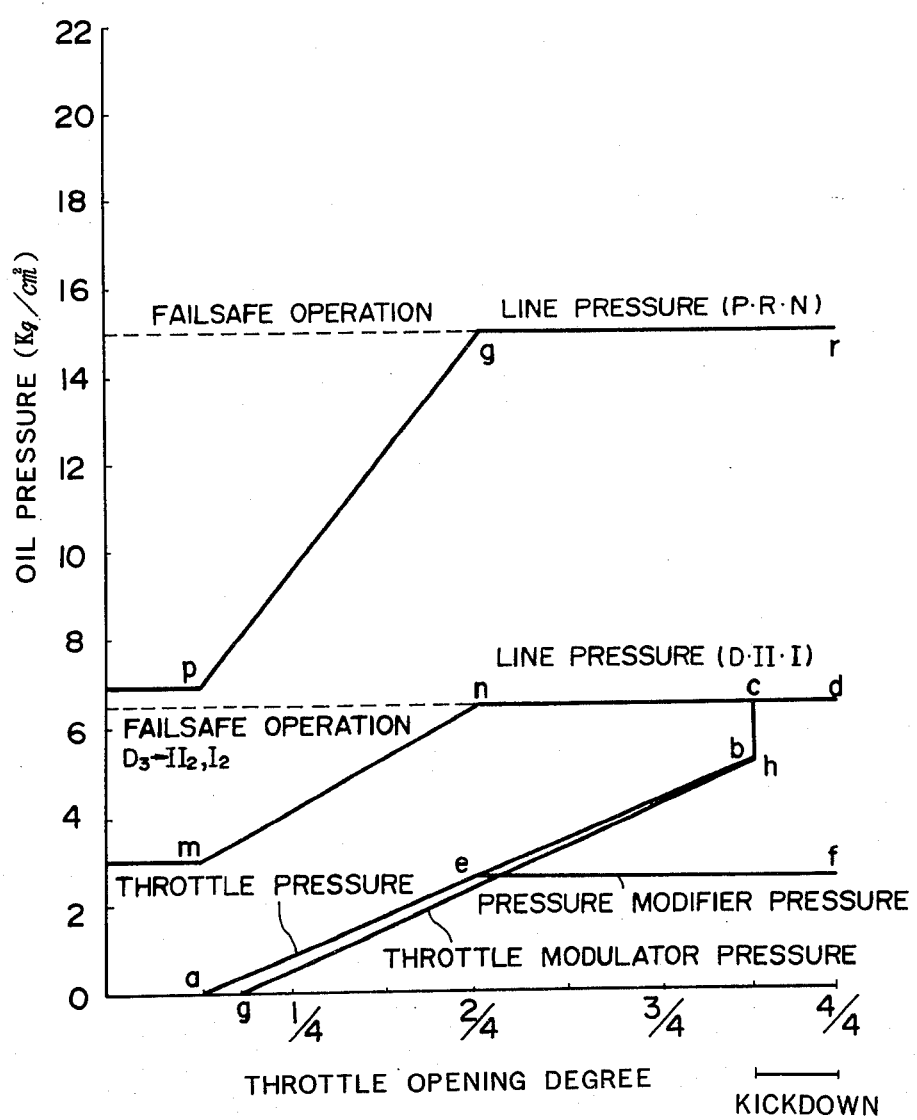
FIG. 3 is a graph showing the characteristics of various pressures developed in the hydraulic control system of FIG. 2.

With the throttle modulator valve 10 thus constructed, the valve spool 10e is held in the position indicated by the lower half thereof by the force of the spring 10g when the throttle pressure directed through the oil conduit 49 into the chamber 10h is zero. Under this condition, the oil conduit 56 extending from the line pressure circuit 16 is isolated from the circuit 25 and the oil conduit 57 by means of the valve spool 10b and the circuit 25 and the oil conduit 57 are held in communication with the drain port 8h through the oil conduit 53 and the port 9g of the throttle failsafe valve 9 so that there develops no oil pressure in the circuit 25 and the oil conduit 57. As the throttle pressure rises, the valve spool 10e moves beyond the position indicated by the upper half thereof against the force of the spring 10g to direct the line pressure within the oil conduit 56 to the chamber 10i through the oil conduit 57, urging in cooperation with the spring 10g back to the balanced position indicated by the upper half in the drawing. The throttle modulator valve 10 is thus capable of regulating the line pressure from the oil conduit 56 in response to the throttle pressure directed into the chamber 10h and thereby delivering a throttle modulator pressure to the throttle modulator pressure circuit 25, the throttle modulator pressure varies in proportion to the throttle opening degree as shown by g-h in FIG. 3. Under kickdown conditions in which the plunger 8d of the throttle valve 8 is urged to move inwardly, the port 9g is isolated from the drain port 8h as previously discussed and, as a consequence, the throttle pressure (b-c-d in FIG. 3) corresponding to the line pressure is fed from the port 9g to the throttle modulator valve 10 by way of the oil conduit 53 so that an oil pressure corresponding to the line pressure is developed in the throttle modulator pressure circuit 25 and the oil conduit 57 and this pressure is directed into the chamber 10i for urging the valve spool 10e to move to the leftward limit position thereof with the result, under kickdown condition, an oil pressure corresponding in magnitude to the line pressure as shown by h-c-d in FIG. 3 is constantly developed in the circuit 25.

The manual first range pressure reducing valve 11 comprises a housing 11a having slidably mounted therein a valve spool 11b which has one end face acted upon by a spring 11c and the other end face exposed to a chamber 11d. The valve spool 11b is formed with a groove 11e and an oil conduit 58 is permitted to constantly open to this groove, and the oil conduit 58 is allowed to communicate with one input port 28b of the shuttle valve 28 and with the chamber 11d. The housing 11a is further provided with a drain port 11f and is connected to an oil conduit 59 extending from the port 2d of the manual valve 2, these drain port 11f and oil conduit 59 being arranged in such a manner that one of them starts to open when the other completely closes during movement of the valve spool 11b.

Thus, the manual first range pressure reducing valve 11 is operative to partially discharge the line pressure directed from the manual valve 2 to the oil conduit 59 and reduces the line pressure to a constant level determined by the force of the spring 11c in a condition indicated by the left half thereof when the I range is selected, the pressure thus obtained being delivered to the oil conduit 58 so that the low-and-reverse brake 107 which is to be also operative under reverse drive condition is precluded from producing an excessively large torque transmission capacity.

The port 2a of the manual valve 2 is connected through an oil conduit 60 to the other input port 28c of the shuttle valve 28 and is also connected to an input port 61a of a shuttle valve 61 whose output port 61b is allowed to communicate through an oil conduit 62 with the front clutch 104. Provided in the oil conduit 60 is a parallel combination of an orifice 78 and a check valve 79. An accumulator 12 comprises a stepped piston 12b and a stepped cylinder 12c fitted thereto to define chambers 12a, 12d and 12e, and a spring 12f urging the piston 12b downwardly as viewed in the drawing. The chamber 12d communicates through an oil conduit 63 with the oil conduit 29, and the chamber 12e communicates through an oil conduit 64 with the oil conduit 42. The chamber 12a is drained. Provided in the oil conduit 42 upstream of the accumulator 12 is a parallel combination of an orifice 75 and a check valve 76.

The 3-2 timing valve 14 comprises a housing 14a having slidably mounted therein a valve spool 14b which has one end face acted upon by a spring 13c and the other end face exposed to a chamber 14d. The valve spool 14b is responsive to the governor pressure directed from the governor pressure circuit 23 to the chamber 14d by way of an oil conduit 66 and is movable into a lower position, as indicated by the right half of the valve spool 15b in the drawing, allowing the oil conduit 40 to open to an oil conduit 67 leading to the servo release chamber 106'b of the band servo 106' and a raised position isolating the oil conduit 65 from the oil conduit 67 as indicated by the left half of the spool 14b. Between the oil conduits 40 and 67 is provided a parallel combination 80 of a check valve 68 and an orifice 69 which bypasses the 3-2 timing valve 14.

The front clutch pressure reducing valve 15 comprises a housing 15a having slidably mounted therein a valve spool 15b which has one end face acted upon by a spring 15c and the other end face exposed to a chamber 15d. The valve spool 15b is formed with a groove 15e forming lands on both sides thereof. The housing 15a is provided with an oil conduit 70 which is constantly open to the groove 15e and which is in communication with the other input port 61c of the shuttle valve 61. The housing 15a is formed also with a drain port 15g and is in communication with the oil conduit 40, the drain port and the oil conduit being arranged so that one of them is permitted to open when the other of them is completely closed during movement of the valve spool 15b. The housing 15a is still further formed with an oil conduit 71 which is open in radial alignment with the oil conduit 70 and which is in communication with the chamber 15d, and a chamber 15h receiving the spring 15c therein is drained.

With the front clutch pressure reducing valve 15 thus constructed, the valve spool 15b is normally urged by the spring 15c to a lower position isolating the oil conduit 70 from the drain port 15g and connected to the oil conduit 40 as indicated by the right half of the valve spool. When, therefore, the line pressure is directed to the oil conduit 40 through the oil conduit 32 under the control of the 2-3 shift valve 4, this line pressure is directed through the oil conduit 70 and the shuttle valve 61 and the oil conduit 62 to the front clutch 104. This pressure is directed also to the chamber 15d through the oil conduit 71 to urge the spool 15b upwardly in the drawing. The spring 15c acts upon the spool 15b to urge same downwardly in the drawing to the balanced position of the valve spool 15b where the downwardly directed urging force balances with the upward directed urging force. When the pressure supplied to the front clutch 104 reaches a predetermined value, the spool 15b is urged upwardly to the position indicated by the left half in the drawing to isolate the oil conduit 70 from the oil conduit 40 and to allow the former to communicate with the drain port 15g, causing the valve spool to take a balanced position as shown in the left half in the drawing. Therefore, pressure to be supplied to the front clutch does not increase beyond a predetermined level.

The operation of the hydraulic control system is hereinafter explained.

In the first place, the pressure regulator valve 1 is supplied with the pump pressure directed to the chamber 1d from the oil pump 115, the modifier valve pressure directed to the chamber 1j from the pressure modifier valve 7 and the line pressure directed to the chamber 1e from the port 2b of the manual valve 2 only when the manual valve 2 is set to D range or II range or I range, urging the valve spool 1b for downward movement in the drawing. Into the chamber 1g is directed the modifier valve pressure which, in cooperation with the force of the spring 1a, urges the valve spool 1b for upward movement in the drawing. The valve spool 1b is held in a position in which the forces thus exerted thereon are balanced, thereby developing in the circuit 16 a line pressure which is determined by such a position of the valve spool (FIG. 3, m-n-d). The line pressure thus developed is always directed through the circuit 16 into the port 2h of the manual valve 2. When P range or R range or N range is selected, the chamber 1e of the pressure regulator valve 1 is drained off through the port 2b of the manual valve 2 with the result that the line pressure to be developed in the circuit 16 under such conditions (FIG. 3, p-g-r) is made higher than that achieved under any one of the D range or II range or I range conditions because of the fact that there is no force effective to urge the valve spool 1b to move downwardly in the absence of the line pressure in the chamber 1e of the pressure regulator valve 1.

The line pressure supplied to the throttle modulator valve 10 via the line pressure circuit 16 and oil conduit 56 is modulated by this throttle modulator valve 10 into said throttle modulator pressure to be delivered into the circuit 25.

When the driver of the vehicle urges the manual valve 2 to move from N range to D range, the port 2h communicates with the ports 2b, 2g so that the line pressure is directed from the port 2b through the oil conduits 22, 29 to the rear clutch 105 and also directed from the port 2g through the oil conduit 99 to the 2-3 shift valve 4. The line pressure passing through the oil conduit 29 is restricted by the orifice 74 on its way to the rear clutch 105 and is fed to the rear clutch 105 initially at a limited rate and thereafter at a gradually increasing rate. This rear clutch supply pressure is also directed through the oil conduit 63 to the accumulator chamber 12d to urge the stepped piston 12b for downward movement toward a larger diameter side. With the engagement of the rear clutch 105, the automatic transmission enables the vehicle to start to run with the first gear ratio. The line pressure thus supplied from the port 2g of the manual valve 2 through the oil conduit 99 is supplied by the 2-3 shift valve under this condition, causing no function.

The line pressure passed through the port 2b of the manual valve 2 to the oil conduit 22 is also directed to the governor valves 113 and 114 to cause the delivery to the circuit 23 a governor pressure indicative of the vehicle speed as previously described. Since the port 2b of the manual valve 2 communicates with the line pressure circuit 16 to allow the line pressure to extend to the oil conduit 22 throughout all of the forward range positions (D), (II) and (I), the governor pressure is delivered to the governor pressure circuit 23 whenever the manual valve 2 is set in the above mentioned forward drive range.

When the vehicle speed reaches a certain value after the vehicle has moved off from the rest, the governor pressure indicative of the vehicle speed and directed to the chamber 3e of the 1-2 shift valve 3 overcomes the downward force with which the spring 3d exerts on the valve spools 3b and 3c in the positions indicated by the right halves of the spools and the downward force with which the modulated throttle pressure directed from the circuit 25 acts on the differential pressure acting area between the lands 3h and 3i, the valve spools 3b and 3c begin to move upwardly from the positions indicated by the right halves thereof. During this upward movement, when the land 3h disengages out of the bore 31, the chamber between the lands 3h, 3i is drained off through the kickdown pressure circuit 24 via the drain port 8h of the throttle valve 8, causing the downward force which has been exerted upon the spool 3c due to the application on the differential area between the lands 3h, 3i of the throttle modulator pressure to disappear, thus causing the spools 3b, 3c to move instantaneously into the positions indicated by the left halves of the spools in the drawing. This allows the oil conduit 29 branching off the oil conduit 29 to communicate with the oil conduit 31, thus allowing the line pressure which has been directed to the oil conduit 29 as having been described to extend through the oil conduit 30 and 1-2 shift valve 3 to the oil conduit 31. The line pressure to be fed thereafter to the servo apply chamber 106'a of the band servo 106' through the oil conduit 42 is restricted by the orifice 75 on its way toward the servo apply chamber. The servo apply pressure is directed through the oil chamber 64 also to the accumulator chamber 12e to urge the stepped piston 12b in the downward position as previously described to move back against the spring 12f and the pressure within the chamber 12d. This causes the servo apply pressure to rise slowly and enables the band servo 106' to actuate the second brake 106 slowly. This actuation of the second brake 106 causes an upshift from the first gear ratio to the second gear ratio in the transmission in cooperation with the previously described engagement of the rear clutch 105 and a shock which is experienced upon this upshift can be alleviated by the above mentioned operation of the accumulator 12.

As the vehicle speed further increases during operation of the vehicle with the second gear ratio, the governor pressure indicative of this vehicle speed which has reached through the circuit 23 to the chamber 4e of the 2-3 shift valve 4 urges the spool 4b in the downshift position indicated by the right half in the drawing upwardly from this position overcoming the total of a downward force due to the spring 4d and the total of a downward force created by the throttle modulator pressure acting upon differential area (S3) between the lands 4i, 4j and a downward force created by the governor pressure acting upon differential area (S4) between 4k and 4l. During this upward movement, when the land 4i disengages from the bore 4p, the groove between the lands 4i, 4j begins to communicate with the oil conduit 36. The oil conduit 36 is drained off via the drain port 5f of the 3-2 downshift valve 5 as it is in the up-side position. During this upward movement, the land 4l closes the port 4t and the groove between the lands 4k and 4l is drained via the drain port 4w. Thus, the downward force due to the above-mentioned throttle modulator pressure disappears, allowing the spool 4b to move upwardly instantaneously to the position indicated by the left half in the drawing. This causes the oil conduit 99 to communicate with the oil conduit 32, allowing the line pressure having been directed to the oil conduit 99 as previously described to be delivered through the 2-3 shift valve 4 and oil conduit 32 to the oil conduit 40. This line pressure from the oil conduit 40 reaches via the groove 6e and passage 6g of the line pressure booster valve 6 to the chamber 6f, urging the spool 6f for movement in the rightward direction viewing in the drawing from the position indicated by the upper half toward the position indicated by the lower half, and the line pressure is directed though the orifice 69 and check valve 68 to the servo release chamber 106'b and the front clutch pressure reducing valve 15. The line pressure directed to the front clutch reducing valve 15 is reduced according to the previously mentioned pressure modulation function to this valve, and the front clutch 104 is supplied with the thus reduced pressure through the oil conduit 70, shuttle valve 61 and oil conduit 62. The application of the line pressure to the servo release chamber 106'b urges the piston of the band servo 106' to move back toward the servo apply chamber 106'a because the above mentioned piston has a larger pressure acting area on the side adjacent to the servo release chamber 106'b than that on the servo apply chamber 106'a. This causes the release of the second brake 106 by means of the band servo 106'. The release of the second brake 106 during engagement of the front clutch 104 causes an upshift from the second gear ratio to the third gear ratio in the automatic transmission.

Under a condition wherein the spool 5b of the 3-2 downshift valve 5 is in the up-side position indicated by the left half in the drawing against the spring 5c owing to the force built up by the governor pressure fed to the chamber 5d of the 3-2 downshift valve 5 from the circuit 23, if the throttle opening is increased above a predetermined degree as a result of the depression of the accelerator pedal, the throttle modulator pressure indicative of this throttle opening degree is directed from the throttle modulator pressure circuit 25 via the conduit 39 to the 3-2 downshift valve 5 to act upon a differential area between the lands 5e, 5h and urge the spool 5b in cooperation with the spring 5c for downward movement to the position indicated by the right half in the drawing. Communication is now provided between the oil conduits 36 and 39 so that the throttle modulator pressure is fed through the oil conduits 39 and 36 to the port 4x of the 2-3 shift valve 4 and acts upon a differential area (S3) between the lands 4i, 4j of the spool 4b, causing the valve spool 4c for downward movement from the upshift position indicated by the left half to the downshift position indicated by the right half thereof against the force resulting from the governor pressure developed in the chamber 4e. This causes the oil conduits 99 and 32 to be isolated from each other so that the supply of the line pressure to the oil conduit 32 is interrupted and at the same time the oil conduit 32 is permitted to communicate with the drain port 4w whereby the oil pressure which has been fed to the front clutch 104 and the servo release chamber 106'b under the third gear ratio condition is discharged in a manner to be described in the following. As the oil pressure in the chamber 15d of the front clutch pressure reducing valve 15 is eliminated and as a consequence the valve spool 15b is urged to move by the force of the spring 15c to the position providing communication between the oil conduits 40 and 70 as indicated by the right half of the valve spool, the front clutch pressure is discharged at a comparatively high rate through the oil conduit 62, the shuttle valve 61, the oil conduits 70, 40 and 32 and the drain port 4w. On the other hand, the servo release chamber 106'b is drained off through the oil conduit 67, oil conduit 80, orifice 69, oil conduit 40 to the drain port 4w at a comparatively slow rate owing to the provision of the orifice 69. As the vehicle speed has lowered, the governor pressure indicative of the vehicle speed and directed from the governor pressure circuit 23 through the oil conduit 66 to act upon the chamber 14d of the 3-2 timing valve 14 cannot hold the spool 14b in the position indicated by the left half in the drawing against the force of the spring 14c and thus the spool 14 is lowered to the position indicated by the right half in the drawing to establish communication between the oil conduits 40 and 67. In this case, the servo release pressure is discharged through the oil conduit 67, the 3-2 timing valve 14, the oil conduit 40 and the drain port 4w (bypassing the orifice 69), at a rate which is comparatively higher than the rate to be achieved when the vehicle speed is high. In these manners, the servo release pressure is discharged at a relatively low rate, when compared with the discharge rate of the front clutch pressure, determined by the flow rate of oil through the orifice 69 under high vehicle speed conditions and at a relatively high rate when the vehicle speed is relatively low. For these reasons, the actuation of the band servo 106' (and accordingly of the second brake 106 as well) as compared with the timing at which the front clutch 104 is uncoupled is retarded at high vehicle speeds, thereby making it possible to achieve a prolonged neutral interval during which the engine is enabled to increase its output speed to a value to match the vehicle speed while a downshift is being made from the third gear ratio to the second gear ratio without producing gear shift shocks. At low vehicle speeds, the amount of retardation in the actuation of the second brake 106 as compared with the timing at which the front clutch 104 is to be uncoupled decreases so that the amount of retardation provides the period of time which is required for the engine to increase its revolution speed to a level to match the vehicle speed, thereby making it possible to reduce the gear shift shocks to be produced during the above described downshift.

Figure 4:
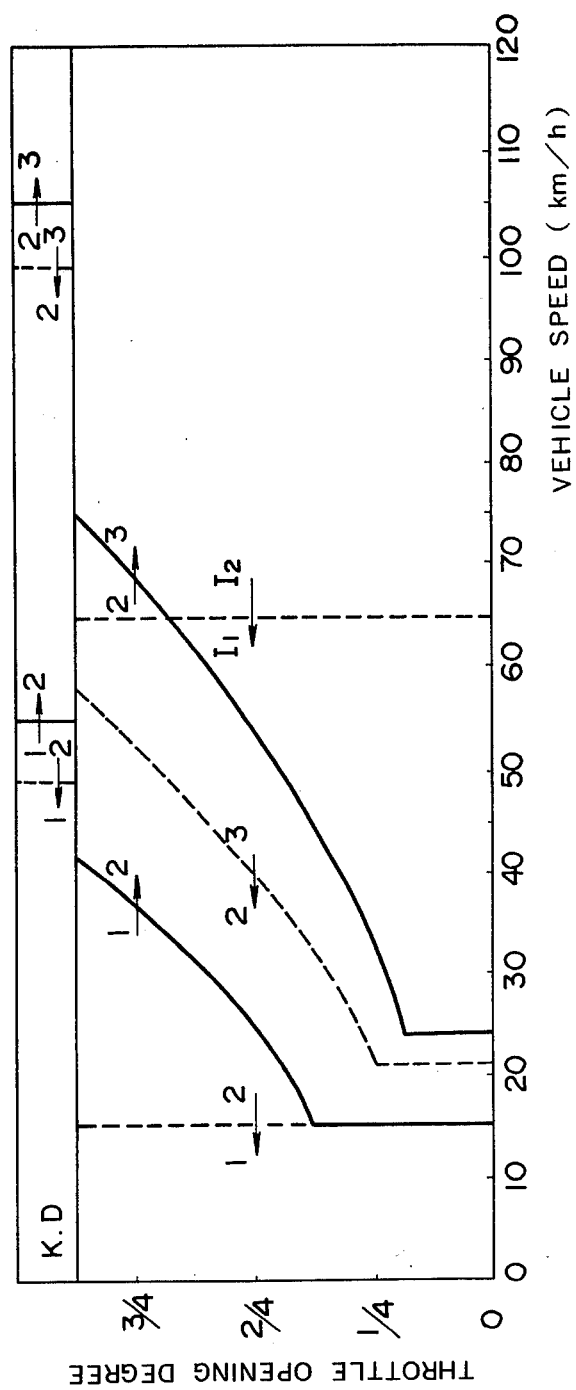
FIG. 4 is a graph showing, by way of example, the shift schedule accomplished by the hydraulic control system of FIG. 2.

In the same manner as described as to the case when the throttle opening degree is high, the 3-2 downshift valve 5 causes a downshift from the third gear ratio to the second gear ratio in the automatic trasmission as long as the throttle opening degree is higher than a certain value even if as a consequence of a drop in the vehicle speed, the governor pressure directed to the chamber 5d also drops accordingly. However, in the case when the throttle opening degree is lower than the certain value, the 3-2 downshift takes place irrespective of the operation of the 3-2 downshift valve 5. Explaining this, if the vehicle speed drops with the throttle opening degree lower than the cetrain value, before the 3-2 downshift valve 5 is switched to the right half position as a result of a drop in the governor pressure, the downward force with which the spring 4d biases the spool 4b downwardly becomes greater than the upward force with which the sprool 4b is urged upwardly by the governor pressure, thus allowing the switching action of the 2-3 shift valve 4 into the position indicated by the right half in the drawing. This switching action of the 2-3 shift valve 4 causes the 3-2 downshift in a previously described manner. The switching action of the 2-3 shift valve 4 under this condition is carried out in response to the relationship between the force of the spring 4d and the governor pressure and not in response to the throttle modulator pressure, thus allowing a downshift to take place always at a fixed vehicle speed. Therefore, a 3-2 downshift line as shown in FIG. 4 is obtained.

As the vehicle speed further decreases, the governor pressure in the chamber 3e of the 1-2 shift valve 3 becomes no longer capable of overcoming the force of the spring 3d so that the spring causes the valve spools 3b and 3c to move downwardly from the positions indicated by the left halves to the positions indicated by the right halves in the drawing, thereby isolating the oil conduits 30 and 31 from each other and permitting the oil conduit 31 to communicate with the drain port 3v. As a consequence, the line pressure which has been fed to the servo apply chamber 106'a is discharged passing through the check valve 76 in the oil conduit 42, through the oil conduit 31 and the drain port 3v, thereby causing the band servo 106' to release the second brake 106. Among the friction elements, the rear clutch 105 only is in the operative state so that a downshift is effected from the second gear ratio to the first gear ratio in the automatic transmission.

When the manual value 2 is thereafter urged to move back to N range, the port 2b is drained so that the line pressure which has been fed to the rear clutch 105 is discharged through the oil conduit 29, the check valve 77 and the oil conduit 22 and further by way of the port 2b of the manual valve 2 and renders all the friction elements of the automatic transmission inoperative, establishing a neutral state in which the transmission of power is interrupted. The line pressure in the port 2g reaches the 2-3 shift valve 4 but the line pressure is stopped by the land 4j of the spool 4b so that there occurs no actuation of the friction elements.

When the accelerator pedal is fully depressed to produce a kickdown condition while the vehicle is running with the above described third gear ratio, the plunger 8d of the throttle valve 8 is urged to move into the rightward limit position thereof as previously described so that a kickdown pressure (having the magnitue of line pressure) is developed in the circuit 24. The kickdown pressure thus developed is directed on one hand to the port 3x of the 1-2 shift valve 3 and on the other hand to the chamber 4s of the 2-3 shift valve 4. The kickdown pressure directed to the chamber 4s of the 2-3 shift valve 4 acts upon the upper end face area (S1) of the land 4h and differential area (S2) between the lands 4h, 4i of the spool 4b which is in the upshift position indicated by left half in the drawing and cooperates with the spring 4d to urge the spool 4b for downward movement to the downshift position indicated by the right half in the drawing. As a consequence, the 2-3 shift valve 4 effects a downshift from the third gear ratio to the second gear ratio in the automatic transmission in a manner similar to that which has been described. If the vehicle speed decreases further, the kickdown pressure which is fed from the circuit 24 to the port 3x of the 1-2 shift valve 3 to act on the differential area between the lands 3i and 3g cooperates with the spring 3d to urge the spools 3b, 3c for downward movement from the position indicated by the left half in the drawing to the position indicated by the right half in the drawing against the governor pressure acting within the chamber 3e. As a consequence, the 1-2 shift valve 3 effects a downshift from the second gear ratio to the first gear ratio in a manner similar to that which has been described. When, in the kickdown state, the downshift valve 3 and 2-3 shift valve 4 are in the positions indicated by the right half thereof in the drawing, the throttle modulator pressure provided to the circuit 25 acts upon the differential area between the lands 3h, 3i of the spool 3b of the 1-2 shift valve 3 which is in the position indicated by the right half in the drawing and also upon the differential area (S3) between the lands 4i and 4j of the spool 4b of the 2-3 shift valve 4 which is in the downshift position indicated by the right half in the drawing, thus urging the spools downwardly. The kickdown pressure in the circuit 24 acts upon the differential area between the lands 3f and 3h of the spool 3b which is in the position indicated by the right half in the drawing and the governor pressure acts upon the differential area (S4) between the lands 4k and 4l of the spool 4b which is in the downshift position indicated by the right half in the drawing, urging the respective spools downwardly. Besides, the downward forces due to the springs 3d and 4d act upon the spools of both shift valves 3 and 4. The above described downward forces thus exerted on the spools of the shift valves 3 and 4 are opposed by the forces resulting from the governor pressure developed in the chambers 3e and 4e so that, when the vehicle speed becomes such a value that the governor pressure resulting therefrom overcomes the downward forces exerted on the valve spool 3c of the 1-2 shift valve 3, then the 1-2 shift valve 3 effects an upshift from the first gear ratio to the second gear ratio in the manner previously described and, when the vehicle speed becomes such a value that the governor pressure resulting therefrom overcomes the downward forces exerted on the valve spool of the 2-3 shift valve 4, then the 2-3 shift valve 4 effects an upshift from the second gear ratio to the third gear ratio in the manner previously described. Since, however, the downward forces exerted on the valve spools of shift valves 3 and 4 are stronger than the downward forces which are exerted thereon under ordinary throttle valve opening degree range (non-kickdown), an upshift can not be effected and accordingly acceleration can be achieved by a large driving power with a low gear ratio before the vehicle speed is increased beyond levels corresponding to the ordinary throttle valve opening degree range. The shift line diagram obtained as explained above is illustrated in FIG. 4.

The operation is explained when II range is selected by the manual valve 2 under a condition in which the vehicle is running with the third gear ratio with the manual valve 2 held in the D range position. Under condition in which the third gear ratio in D range is in play, the line pressure directed to the oil conduit 40 is passed through the groove 6e and the oil passage 6g to the chamber 6f and causes the valve spool 6b to move from the position indicated by the upper half to the position indicated by the lower half thereof against the force of the spring 6c. After this movement, the valve spool 6b is maintained in the latter position by the line pressure which is directed from the oil conduit 31 to the chamber 6f by way of the groove 6e and the oil passage 6g. When the manual valve 2 is moved to the II range position thereof under these conditions, the line pressure circuit 16 is permitted to communicate with the ports 2b and 2c, while, the port 2g is drained off. The line pressure is directed through the port 2b to the same places as those previously described and through the port 2c to the oil conduit 45. If the port 2g is drained, the oil conduit 32 is drained off through the oil conduit 99 and the 2-3 shift valve 4, the oil conduit 32 is left drained off irrespective of the positions of the spool 4b of the 2-3 shift valve 4, withdrawing the pressure which has been supplied to the front clutch 104 and the servo release chamber 106'b to render the automatic transmission to downshift from the third gear ratio to the second gear ratio. Therefore, an upshift to the third gear ratio will not take place irrespective of the vehicle speed. Since the line pressure booster valve 6 is in the above-mentioned state, the line pressure directed to the oil conduit 45 is directed to the port 7h of the throttle modifier valve 7 through the oil conduit 43 and the shuttle valve 46. This causes the throttle modifier valve 7 to deliver into the oil conduit 54 an upper limit value (e-f in FIG. 3) of the pressure modifier pressure due to the pressure modulation carried out by the throttle modifier valve 7 and thus supplies this throttle modifier pressure with this limit value to the regulator valve 1 over the whole throttle opening degrees. As a result, the regulator valve 1 provides in the line pressure circuit 16 a line pressure with an upper limit magnitude (n-d in FIG. 3) over the whole throttle opening degrees. For this reason, a sufficiently high line pressure is produced and accordingly the rear clutch 105 and the band servo 106' are actuated powerfully during low to medium throttle valve opening degrees, thereby ensuring sufficiently effective engine braking under the II range condition.

When the vehicle speed decreases down to a certain value while the vehicle is running under the II range condition, the valve spool 3b of the 1-2 shift valve 3 is urged to move downwardly from the position indicated by the left half to the position indicated by the right half of the spool under the influence of the spring 3d with the result that a downshift is effected from the second gear ratio to the first gear ratio in the automatic transmission in a manner similar to that previously described. Under this condition, the oil pressure which has been developed in the oil conduit 31 is eliminated and, as a consequence, the valve spool 6b of the line pressure booster valve 6 is liberated from a force holding the valve spool in the righthand position indicated by the lower half of the spool and is therefore urged to move back to the position indicated by the upper half of the spool by the force of the spring 6c. As a result, the line pressure in the oil conduit 45 is prevented from extending beyond the line pressure booster valve 6 and the oil conduit 43 is permitted to communicate with the drain port 9c of the throttle failsafe valve 9. To the port 7h of the pressure modifier valve 7 is thus supplied the line pressure from the oil conduit 48 by the switching action of the shuttle valve 46, thereby enabling the pressure modifier valve 7 to feed the modified pressure to the pressure regulator valve 1 by way of the oil conduit 54 as previously described so that the pressure regulator valve 1 is made operative to develop the above mentioned line pressure in the circuit 16.

As the vehicle speed increases thereafter and as a consequence the governor pressure developed in the chamber 3e of the 1-2 shift valve 3 renders the shift valve into the upshift state thereof, an upshift is effected from the first gear ratio to the second gear ratio in the automatic transmission in the manner previously described. When the line pressure developed in the oil conduit 31 is directed via the oil conduit 41 to the line pressure booster valve 6 under this condition, the valve spool 6b of the valve is maintained in the position indicated by the upper half of the spool and is not caused to move rightwardly. Accordingly, upon shifting into the second gear ratio when the II range is selected under the condition wherein the vehicle is running with the third gear ratio or when the I range is selected under the condition wherein the vehicle is moving with the third gear ratio, the latter case being discussed later, the line pressure is maintained at a constant level which is relatively high throughout the whole range of the throttle valve opening degrees as previously described and enables the second brake to grasp the clutch drum with a sufficient force so as to ensure engine braking under II range condition. Once the first gear ratio is achieved, however, the line pressure can not be boosted and accordingly the gear shift shock is not amplified even when repeated alternate downshift and upshift are made between the second gear ratio and the first gear ratio and vice versa. When a shift is to be made from the second gear ratio in D range to II range or I range, the second brake is kept on grasping the clutch drum so that the line pressure needs not be augmented by means of the line pressure booster valve 6.

When the manual valve 2 is then urged to move to I range, the line pressure circuit 16 is permitted to communicate not only with the ports 2b and 2c but with the port 2d. The line pressure passed through the ports 2b and 2c is directed to the same places as those previously described and the line pressure passed through the port 2d is supplied to the manual first range pressure reducing valve 11. There being initially no oil pressure in the chamber 11d of the pressure reducing valve 11, the valve spool 11b is maintained in the lower position indicated by the right half of the spool by the force of the spring 11c. When, however, the line pressure directed from the oil conduit 59 is passed to the chamber 11d and causes the valve spool 11b to move upwardly so that the line pressure is partially discharged through the drain port 11f, the valve spool assumes a balanced position indicated by the left half of the spool, thereby reducing the line pressure to a value equal to the force of the spring 11c acting on the valve spool in the particular position. The line pressure directed to the oil conduit 59 is reduced to a constant and the reduced pressure thus obtained is passed through the oil conduit 58, the shuttle valve 28 and the oil conduit 26 and acts on the land 3n of the spool 3c of the 1-2 shift valve 3, exerting a downward force on the valve spool 3c. At a vehicle speed at which the downward force is smaller than the upward force resulting from the governor pressure developed in the chamber 3e, the valve spools 3b and 3c are held in the positions indicated by the respective left halves of the spools and maintain the automatic transmission in the second gear ratio state, thereby preventing the engine from overrunning which would otherwise be caused when, for example, I range is selected while the vehicle is running at a high speed. In this instance, the line pressure is augmented by means of the line pressure booster valve 6 to assure effective engine braking in the same manner as previously described in connection with the operation under II range position only when the second gear ratio is established as a result of selecting I range position during operation with the third gear ratio. As the vehicle speed decreases and as a consequence the upward force resulting from the governor pressure developed in the chamber 3e decreases, the valve spool 3c moves downwardly to the position indicated by the right half of the spool by the downward force resulting from the previously mentioned constant and reduced oil pressure acting on the land 3l of the valve spool 3c, while, the spool 3b is maintained in the position indicated by the left half thereof and spaced apart from the spool 3c by the above mentioned constant reduced oil pressure with the spring 3d in a compressed state. Under this condition, the oil conduit 27 which has been opened to the drain port 3s is permitted to communicate with the oil conduit 26 and allows the constant reduced oil pressure in the oil conduit 26 to be directed through the oil conduit 27 to the low-and-reverse brake 107 so that the automatic transmission can drive the vehicle under I range condition while producing an engine braking effect by means of the low-and-reverse brake thus actuated and the rear clutch 105 which is kept engaged. The manual first range pressure reducing valve 11 is adapted to reduce the line pressure from the oil conduit 59 to a constant value dictated by the force of the spring 11c and delivers the reduced oil pressure to the oil conduit 58 so that the shift point for the 1-2 shift valve 3 can be chosen to occur at a desired constant vehicle speed under manual first condition for thereby preventing, without any delay, the engine from overrunning over the whole range of the throttle valve opening degree.

When the manual valve 2 is urged to move from N range to R range, the line pressure circuit 16 is permitted to be in communication with the ports 2a and 2g. From the port 2a, the line pressure is passed through the oil conduit 60 and is directed on one hand through the shuttle valve 28 and the oil conduit 26 to the 1-2 shift valve 3 and further through the oil conduit 27 to the low-and-reverse brake 107 via the 1-2 shift valve because the valve spools 3b and 3c are held in the positions indicated by the right halves thereof in the absence, in the chamber 3e, of a governor pressure which is to be developed only under forward drive condition. On the other hand, the line pressure is supplied through the orifice 78, shuttle valve 61 and oil conduit 62 to the front clutch 104. The line pressure to be passed to the front clutch 104 is restricted by the orifice 78 on its way to the front clutch so that the oil pressure to be developed in the front clutch increases initially at a low rate and thereafter at a gradually increasing rate. Therefore, the automatic transmission mechanism is thus made operative to drive the vehicle rearwardly with the front clutch 104 coupled and the low and reverse brake 107 actuated. It may be noted that the line pressure at the port 2g of the manual valve 2 is blocked by the 2-3 shift valve 4 in the same manner as in N range.

When the manual valve 2 is urged to move back to N range, the port 2a is allowed to open to the drain port so that the line pressure in the front clutch 104 is discharged quickly through the oil conduit 62, the shuttle valve 61, oil conduit 60, check valve 79 and port 2a of the manual valve 2, while, the line pressure in the low-and-reverse brake 107 is discharged quickly by way of the oil conduits 27, 26, shuttle valve 28, oil conduit 60 and port 2a of the manual valve 2, thereby rendering the automatic transmission into the neutral condition.

Hereinafter more precise description as to the 2-3 shift valve 4 and 3-2 downshift valve 5 follows. The 2-3 shift valve 4 cooperates with the 3-2 downshift valve 5 to provide a 2-3 upshift line and a 3-2 downshift line as shown in FIG. 4, but, these shift lines can be changed widely as explained hereinafter if an area of each land of the 2-3 shift valve and 3-2 downshift valve 5 and the specification of the springs 4d, 5c are changed.

Considering now the balance of the forces acting upon the spool 4b of the 2-3 shift valve 4, what is acting upon the spool as an upwardly directed force, viewing in FIG. 2, is a force resulting from the governor pressure acting upon the lower face of the land 4l only, but, a downwardly directed force is the total of forces resulting from oil pressure acting on the upper end face area (S1) of the land 4h, oil pressure acting on the differential area (S2) between the lands 4h and 4i, oil pressure acting on the differential area (S3) between the lands 4i and 4j, and oil pressure acting on the differential area (S4) between the lands 4k and 4l in addition to downwardly directed force due to the force of the spring 4d. The position of the spool 4b is determined by the balance of these downwardly directed and upwardly directed forces. The chamber 4s receives kickdown pressure having the magnitude as shown by c-d in FIG. 3 under a kickdown condition only, the port 4x receives the throttle modulate pressure only when the 3-2 downshift valve 5 is in the down-side position, the port 4u receives the throttle modulator pressure and the port 4t receives the governor pressure. As will be understood from FIG. 3, the throttle modulator pressure shows the throttle opening dependent characteristic g-h during operation under a non-kick down condition, but increases up to the level of line pressure c-d during operation under a kickdown condition. Therefore, oil pressures at the ports 4x and 4p increase to the same level as the kickdown pressure under kickdown condition.

The relationship of the pressures with the pressure acting areas S1, S2, S3 and S4 is tabulated as follow.

| 3-2 Down Shift Valve | | 2-3 Shift Valve | | | | | Shift Line |
|---|---|---|---|---|---|---|---|
| | | | S1 | S2 | S3 | S4 | |
| Non Kick Down | up-side position | upshift position | X | X | X | X | D1 |
| | | downshift position | X | X | $P_{TH}$ | $P_G$ | U1 |
| | down-side position | upshift position | X | X | $P_{TH}$ | X | D2 |
| | | downshift position | X | $P_{TH}$ | $P_{TH}$ | $P_G$ | U2 |
| Kick Down | up-side position | upshift position | $P_{KD}$ | $P_{KD}$ | X | X | D3 |
| | | downshift position | $P_{KD}$ | X | $P_{KD}$ | $P_G$ | U3 |
| | down-side position | upshift position | $P_{KD}$ | $P_{KD}$ | $P_{KD}$ | X | D4 |
| | | downshift position | $P_{KD}$ | $P_{KD}$ | $P_{KD}$ | $P_G$ | U4 |

In the Table, X designates drain, $P_{TH}$ throttle modulator pressure (g-h in FIG. 3), $P_{KD}$ kickdown pressure (c-d in FIG. 3), and $P_G$ governor pressure indicative of vehicle speed.

Figure 5:
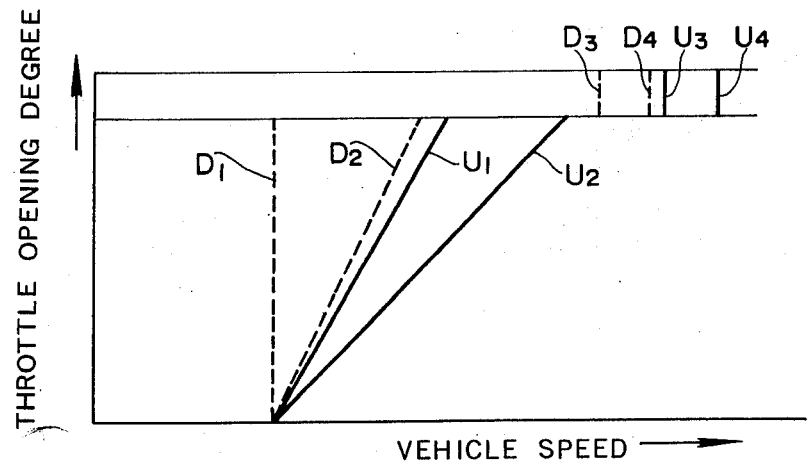
FIG. 5 is a graph showing, by way of example, the simplified characteristics of two theoretical upshift lines U1, U2 under a non-kickdown condition and U3, U4 under a kickdown condition and two theoretical downshift lines D1, D2 under a non-kickdown condition and D3, D4 under kickdown condition, which are provided by a 2-3 shift valve 4 of the hydraulic control systems of FIG. 2.

As will be clear from this Table, the 2-3 shift valve 4 has two sets of shift lines under non-kickdown condition (upshift lines U1, U2 and downshift lines D1, D2) and another two sets of shift lines under a kickdown condition (upshift lines U3, U4 and downshift lines D3, D4). These shift lines U1 through U4, and D1 through D4 are shown by way of example, in FIG. 5. Since in usual cases the governor pressure $P_G$ traces a quadratic curve, the upshift lines U1 and U2 take also quadratic curves in these cases, but for the sake of simplicity they are drawn as straight lines. The inclination and position of each of the shift lines may be changed in response to variation in the dimension of each land, the characteristic of the spring 4d of the 2-3 shift valve 4. These eight shift lines are theoretical shift lines and therefore not all of them actually appear, but the actual shift is carried out along one of the U1 and U2 and one of the D1 and D2, one of D3 and D4, one of U3 and U4 depending upon the position of the 3-2 downshift valve 5 (these shift lines actually used are hereinafter called as actual shift lines).

Figure 6:
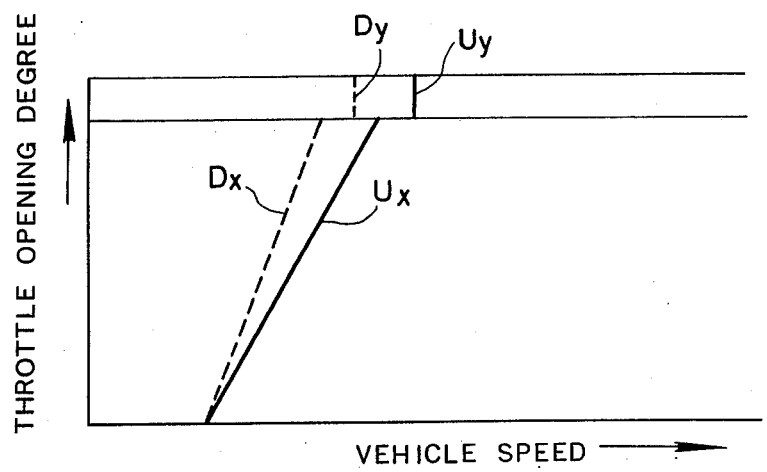
FIG. 6 is a graph showing, by way of example, the simplified characteristics of upshift and downshift lines Ux, Dx under non-kickdown condition and Uy, Dy, under kickdown condition, which are provided by a 3-2 downshift valve 5 of the hydraulic control system of FIG. 2.

The position of the 3-2 downshift valve 5 is determined upon the relationship between the governor pressure and throttle modulator pressure. Viz., when the spool 5b is in the down-side position thereof, upshift lines Ux, Uy of the 3-2 downshift valve 5 are determined by the balance of an upward force, viweing in the Figure, resulting from the governor pressure acting upon the lower end face of the land 5h and a downwardly directed force, viz., the total of a force resulting from the throttle modulator pressure acting upon the differential area between the lands 5h and 5i and an additional force resulting from the spring 5c, while, when the spool 5b is in the up-side position thereof, downshift lines Dx, Dy are determined by the balance of a downwardly directed force, viz., the total of a force resulting from the throttle modulator pressure acting upon the differential area between the lands 5e, 5h and an additional force resulting from the force of the spring 5c and an upwardly directed force resulting from the governor pressure. These shift lines Ux, Uy and Dx, Dy are shown in FIG. 6. The inclination and position of these shift lines may be changed in response to variation in the dimension in each of the lands and the characteristic of the spring 5c of the 3-2 downshift valve 5.

Figure 7:
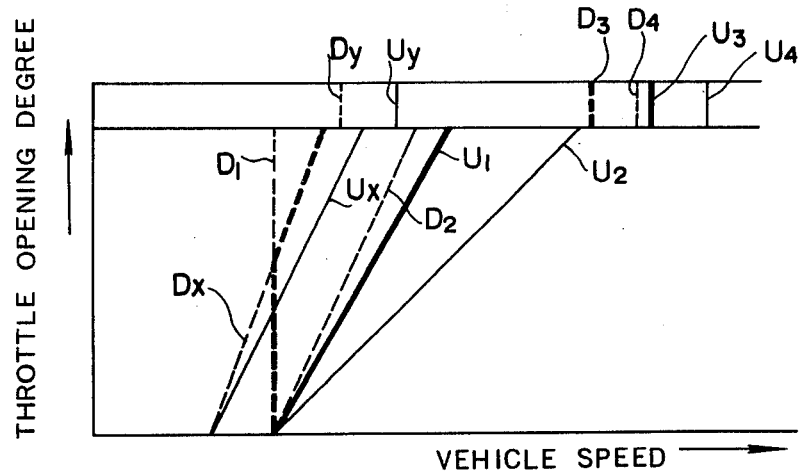
FIG. 7 is a graph showing, in bold solid line, an actual upshift line and, in bold broken lines, an acutal downshift line as obtained from the characteristics of the theoretical shift lines shown in FIGS. 5 and 6.
Figure 8:
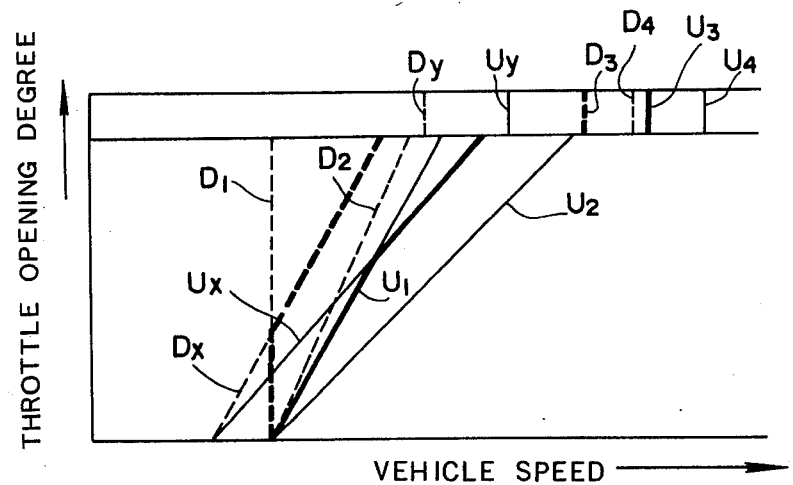
FIG. 8 is a graph showing, in bold solid line, another example of an actual upshift line and, in bold broken lines, another example of an actual downshift line as obtained from the characteristics of another example of theoretical shift lines shown in this Figure.
Figure 9:
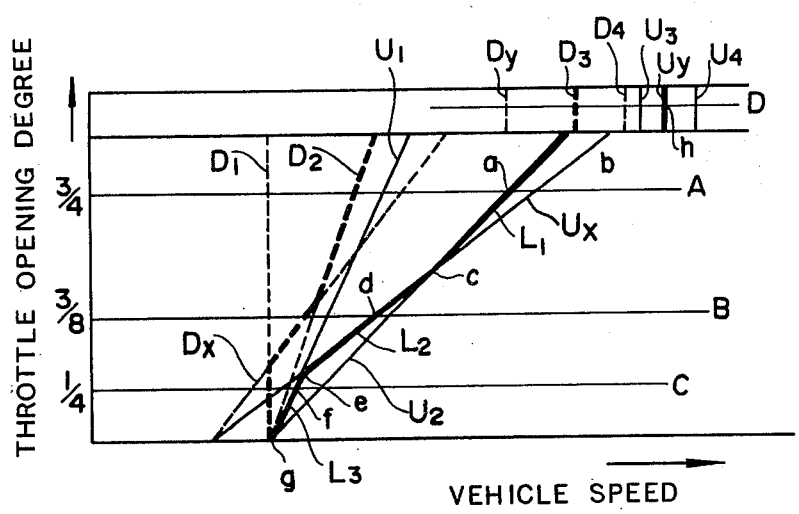
FIG. 9 is a graph showing, in bold solid line, still another example of an actual upshift line and, in bold broken lines, still another example of an actual downshift line as obtained from the characteristics of still another example of theoretical shift lines shown in this Figure.

Actual upshift lines as shown by the solid and broken bold lines in FIGS. 7 through 9, respectively, may be obtained by changing each of the shift lines U1 through U4, D1 through D4 of the above mentioned shift valve 4 and changing each of the shift lines Ux, Uy, Dx, Dy of the 3-2 downshift valve 5. Of course, the other many combinations are possible. As previously described, the actual shift lines along each of which the automatic transmission is subject to a shift are determined by any one of the combinations of the shift lines U1 through U4, D1 through D4 and the shift lines Ux, Uy, Dx, Dy and therefore in the cases of the combinations as shown in the above-mentioned FIGS. 7 through 9 the acutal shift lines as shown by the bold lines are obtained.

The way how the actual shift lines shown by the bold lines in FIG. 9 are drawn is explained. With the throttle opening degree maintained to the degree ⅔, if the vehicle speed increases gradually along the line A, both of the 2-3 shift valve 4 remains in the downshift position and 3-2 downshift valve 5 in the down-side, position respectively, until the line A intersects the line U2, thus providing the second gear ratio. Since the 3-2 downshift valve 5 is maintained in the down-side position until the line A intersects the line Ux and thus the 2-3 shift valve 4 is subject to a shift change along the shift lines U2 and D2, the 2-3 shift valve 4 is subject to an upshift at the point a where the shift line A intersects the line U2. It goes the same from a point b to a point c, thus providing the actual shift line as shown by the bold line section L1. If the vehicle speed increases along a line B with the throttle opening degree ⅔, the 3-2 downshift valve 5 is maintained in the down-side position until the line B intersects the shift line Ux at a point d and the 2-3 shift valve 4 is subject to a shift along the shift lines U2 and D2. However, the line B does not intersect with the shift line U2 before it intersects Ux, thus the 2-3 shift valve 4 is not subject to a shift at this moment. If the line B intersects the shift line Ux at a point d, the 3-2 downshift valve 5 changes into the up-side position, causing the 2-3 shift valve 4 to effect a shift along the shift lines U1 and D1, but, since the point d is within a range beyond the shift line U1, the 2-3 shift valve 4 changes into the upshift position immediately, causing an upshift to take place. In other words, the 2-3 shift valve 4 changes into the upshift position at the same time when the 3-2 downshift valve 5 changes into the up-side position. It goes the same from the point c to the point e (the intersections with the lines U1 and Ux), thus providing the bold line section L2. If the vehicle speed gradually raised along the line C with the throttle opening degree of ¼, the 3-2 downshift valve 5 changes into the upside when the line C intersects the shift line Ux, causing the 2-3 shift valve 4 to change along the shift lines U1 and D1, causing an upshift at point f when the line C intersects the shift line U1. It goes the same from the point e to the point g, thus providing the bold line section L3. Accordingly, the actual bent shift line as shown the bold line sections L1, L2 and L3 is obtained. In the same manner, the actual shift line as shown by the bold lines can be contained.

Consideration is now made of kickdown condition. If the vehicle speed increases along the line D, during the initial stage the 2-3 shift valve 4 is in the downshift position and 3-2 down shift valve 5 is in the down-side position, respectively, thus providing the second gear ratio. Since the 3-2 downshift valve 5 is maintained in the down-side position until the line D intersects with Uy, the 2-3 shift valve 4 is in the downshift position. Upon the D line intersecting with the line Uy at a point h the 3-2 downshift valve 5 changes into the up-side position, because the point h is disposed within a range beyond the line U3, the 2-3 shift valve 4 changes into the upshift position immediately to effect an upshift because the point h is diposed within a range beyond the line U3. Therefore, the actual shift line Uy is obtained. Consider how the deceleration along the D line, if the 2-3 shift valve 4 is in the upshift position and 3-2 downshift valve 5 is in the up-side position at the initial stage. The 3-2 downshift valve 5 is maintained in the up-side position until the line D intersects with the line Dy. Since the D line intersects with the D3 before intersecting with the line Dy, the downshift takes place at the shift line D3. Therefore, the shift lien D3 becomes the actual shift line.

In the preceding description, the present invention has been applied to 2-3shift, but it may be applied to 1-2 shift or 3-4 shift of a four speed automatic transmission.

What is claimed is:

1. A hydraulic control system for an automatic transmission for a motor vehicle having an internal combustion engine with a throttle valve, the automatic transmission including at least one forward drive gear ratio lower than at least one other forward drive gear ratio, the transmission including a plurality of friction elements including a friction element for contributing to shifting between the one forward drive gear ratio and the one other forward drive gear ratio, the hydraulic control system comprising:

a first shift valve having a housing with a wall portion defining a valve bore;

a second shift valve having a housing with a wall portion defining a valve bore;

line pressure generating means for delivering a line pressure to said first shift valve;

first signal pressure generating means for delivering a first signal pressure to said first and second shift valves;

second signal pressure generating means for delivering a second signal pressure to said first and second shift valves;

kickdown pressure generating means for delivering a kickdown pressure to said first shift valve;

said first shift valve including a line pressure inlet port, a line pressure outlet port, a first signal pressure port, a second signal pressure port receiving said second signal pressure and a kickdown pressure port receiving kickdown pressure, said line pressure inlet and outlet ports, said first signal pressure and second signal pressure ports, and said kickdown pressure port being disposed in said wall portion of said first shift valve;

said line pressure inlet and outlet ports being selectively communicating with each other;

said second shift valve including a signal pressure inlet port receiving said second signal pressure, and a signal pressure outlet port communicating with said first signal pressure port of said first shift valve, said signal pressure inlet and signal pressure outlet ports being disposed in said wall portion of said second shift valve;

said signal pressure inlet and outlet ports of said second shift valve selectively communicating with each other;

said first shift valve including a valve element movable within said valve bore of said first shift valve between a downshift position and an upshift position;

said valve element of said first shift valve including means for effecting communication between said line pressure inlet and outlet ports when said valve element of said first shift valve is in the upshift position to, in turn, effect communication between said line pressure generating means and the friction element to establish the one forward drive gear ratio, said valve element of said first shift valve also including means for blocking communication between said line pressure inlet and outlet ports when said valve element is in the downshift position to, in turn, block communication between said line pressure generating means and the friction element;

said valve element of said first shift valve including a first pressure acting area exposed to pressure from said first signal pressure port of said first shift valve when said valve element of said first shift valve is in the downshift position, a second pressure acting area exposed to second signal pressure from said second signal pressure port of said first shift valve when said valve element of said first shift valve is in the downshift position, said second pressure acting area being exposed to pressure from said first signal pressure port of said first shift valve when said valve element of said first shift valve is in the upshift position, and a third pressure acting area exposed to kickdown pressure from said kickdown pressure port when said valve element of said first shift valve is in any one of the downshift and upshift positions, said first pressure acting area being exposed to kickdown pressure from said kickdown pressure port when said valve element of said first shift valve is in the upshift position, said valve element of said first shift valve having an end pressure acting area exposed to said first signal pressure from said first signal pressure generating means when said valve element of said first shift valve is in any one of the downshift and upshift positions, said second shift valve including a valve element movable in said valve bore of said second shift valve between first and second positions;

said valve element of said second shift valve including means for effecting communication between said signal pressure inlet and signal pressure outlet ports of said second shift valve when said valve element of said second shift valve is in the first position to, in turn, effect communication between said second signal pressure generating means and said first signal pressure port of said first shift valve, said valve element of said second shift valve further including means for blocking communication between said signal pressure inlet and signal pressure outlet ports of said second shift valve when said valve element of said second shift valve is in the second position to, in turn, block communication between said second signal pressure generating means and said first signal pressure port of said first shift valve;

said valve element of said second shift valve further including a first pressure acting area exposed to second signal pressure from said signal pressure inlet port of said second shift valve when said valve element of said second shift valve is in the first position and a second pressure acting area exposed to second signal pressure from said signal pressure inlet port when said valve element of said second shift valve is in the second position, said valve element of said second shift valve having an end pressure acting area exposed to said first signal pressure from said first signal pressure generating means.

2. A hydraulic control system as claimed in claim 1, wherein said first signal pressure is a governor pressure indicative of a vehicle speed of the motor vehicle, and said second signal pressure is a throttle modulator pressure indicative of an opening degree of the throttle valve, said throttle modulator pressure being the same magnitude of the kickdown pressure under a kickdown condition.

3. A hydraulic control system as claimed in claim 1 or 2, wherein said third pressure acting area receiving the kickdown pressure from said kickdown pressure port changes in area depending upon one of the downshift and upshift positions of said valve element of said first shift valve.

4. A hydraulic control system as claimed in claim 1 or 2, wherein said valve element of said first shift valve is a valve spool having thereon first, second, and third circumferential lands which are larger in diameter in this sequence and which are axially spaced from each other, said valve element of said first shift valve including at least one circumferential groove between each two adjacent lands, said first pressure acting area of said valve element of said first shift valve includes a circumferential groove between said first and second circumferential lands, said second pressure acting area of said valve element of said first shift valve includes a circumferential groove between said second and third circumferential lands, said third pressure acting area includes said first land, and said third land blocks said second signal pressure port when said valve element of said first shift valve is in the upshift position.

5. A hydraulic control system as claimed in claim 4, wherein said valve spool includes a fourth land, said valve element of said first shift valve including a circumferential groove between said third and fourth circumferential lands, and said means for effecting communication between said line pressure inlet and outlet ports including the groove between said third and fourth circumferential lands, said means for blocking communication between said signal pressure inlet and outlet ports includes said third circumferential land.

6. A hydraulic control system as claimed in claim 5, wherein said first shift valve includes a third signal pressure port receiving said first signal pressure, said valve element of said first shift valve includes a fourth pressure acting area exposed to first signal pressure from said third signal pressure port when said valve element of said first shift valve is in the downshift position.

7. A hydraulic control system as claimed in claim 6, wherein said valve spool of said first shift valve includes a fifth land larger in diameter than said fourth land, said valve element of said first shift valve including a groove between said fifth and sixth lands, said fourth pressure acting area including the groove between said fourth and fifth lands, said fifth land of said valve spool of said first shift valve blocking said third signal pressure port of said first shift valve when said valve element of said first shift valve is in the upshift position.

8. A hydraulic control system as claimed in claim 7, wherein said valve element of said second shift valve is a valve spool having thereon first, second and third circumferential lands which are larger in diameter in this sequence and which are axially spaced from each other, said valve element of said second shift valve including at least one circumferential groove between each two adjacent lands;

wherein said first pressure acting area of said valve element of said second shift valve includes a groove between said first and second lands of said valve spool of said second shift valve and a groove between said second and third lands of said valve spool of said second shift valve; and wherein said second pressure acting area of said valve element of said second shift valve includes the groove between said second and third lands of said valve spool of said second shift valve.

* * * * *